(12) United States Patent
Zhang et al.

(10) Patent No.: US 7,414,567 B2
(45) Date of Patent: Aug. 19, 2008

(54) ADS-B RADAR SYSTEM

(75) Inventors: Yan Zhang, Norman, OK (US); Jinglu Qiao, North Potomac, MD (US)

(73) Assignee: Intelligent Automation, Inc., Rockville, MD (US)

( * ) Notice: Subject to any disclaimer, the term of this patent is extended or adjusted under 35 U.S.C. 154(b) by 54 days.

(21) Appl. No.: 11/644,422

(22) Filed: Dec. 22, 2006

(65) Prior Publication Data

US 2008/0150784 A1 Jun. 26, 2008

(51) Int. Cl.
*G01S 13/93* (2006.01)

(52) U.S. Cl. .............................. 342/29; 342/21; 342/30; 342/42; 342/46; 342/133; 342/139; 342/140; 342/146; 342/192; 342/194

(58) Field of Classification Search ............... 342/21, 342/29–40, 42, 46, 51, 90, 133, 139, 140, 342/146, 192, 194, 195
See application file for complete search history.

(56) References Cited

U.S. PATENT DOCUMENTS

| | | | |
|---|---|---|---|
| 5,636,123 | A | 6/1997 | Rich et al. |
| 6,064,335 | A | 5/2000 | Eschenbach |
| 6,124,825 | A * | 9/2000 | Eschenbach ............ 342/357.08 |
| 6,278,396 | B1 | 8/2001 | Tran |
| 6,459,411 | B2 | 10/2002 | Frazier et al. |
| 6,545,631 | B2 * | 4/2003 | Hudson et al. ................ 342/30 |
| 6,683,541 | B2 | 1/2004 | Staggs et al. |
| 6,789,016 | B2 | 9/2004 | Bayh et al. |
| 6,911,936 | B2 | 6/2005 | Stayton et al. |
| 6,952,631 | B2 * | 10/2005 | Griffith et al. ................. 701/13 |
| 7,006,032 | B2 | 2/2006 | King et al. |
| 2002/0011950 | A1 | 1/2002 | Frazier et al. |
| 2002/0154061 | A1 | 10/2002 | Frazier, Jr. et al. |

(Continued)

FOREIGN PATENT DOCUMENTS

WO 2006/040730 A2 4/2006

OTHER PUBLICATIONS

ADS-B Technologies, LLC., "ADS-B Automatic Dependent Surveillance—Broadcast", http://www.ads-b.com/home.htm, Aug. 31, 2006, 2 pages.

(Continued)

*Primary Examiner*—John B Sotomayor
(74) *Attorney, Agent, or Firm*—Baker & Daniels LLP

(57) ABSTRACT

A system and method of using a standard ADS-B transmitter and encoder to identify targets to provide a collision avoidance system, wherein the method includes the steps of providing a standard ADS-B transmitter and encoder, a phase modulator including a digital synthesizer, radio-frequency electronics, antennas, and a radar transceiver; synthesizing digital-based band signals from the ADS-B transmitter with additional random phase modulation using the digital synthesizer; using the antennas to both transmit and receive signals; and estimating angles-of-arrival for every target in a field-of-view. The method may include the steps of demodulating the signals received by the antennas, providing a digital signal processor, and performing matched filtering on received signals. The method may also include the step of estimating a target range of identified targets using the digital signal processor.

39 Claims, 4 Drawing Sheets

U.S. PATENT DOCUMENTS

| | | |
|---|---|---|
| 2003/0016159 A1 | 1/2003 | Stayton et al. |
| 2003/0154018 A1 | 8/2003 | Lai |
| 2003/0233192 A1* | 12/2003 | Bayh et al. .................. 701/301 |
| 2005/0187677 A1* | 8/2005 | Walker ........................ 701/16 |
| 2006/0119502 A1 | 6/2006 | Ootomo et al. |
| 2006/0197700 A1 | 9/2006 | Stevens et al. |
| 2008/0055149 A1* | 3/2008 | Rees et al. .................... 342/29 |

OTHER PUBLICATIONS

"Explanation of Azimuth and Elevation", http://www.satsig.net/azelhelp.htm, Nov. 10, 2006, 2 pages.

Ortega, Inaki de Mingo and Repolles, Eduardo Portu, "The Phase Coherence Problem in PSK Modulation", undated, 7 pages.

Garmin, "ADS-B Creates a New Standard of Aviation Safety", http://www.garmin.com/aviation/adsb.html, Aug. 31, 2006, 2 pages.

* cited by examiner

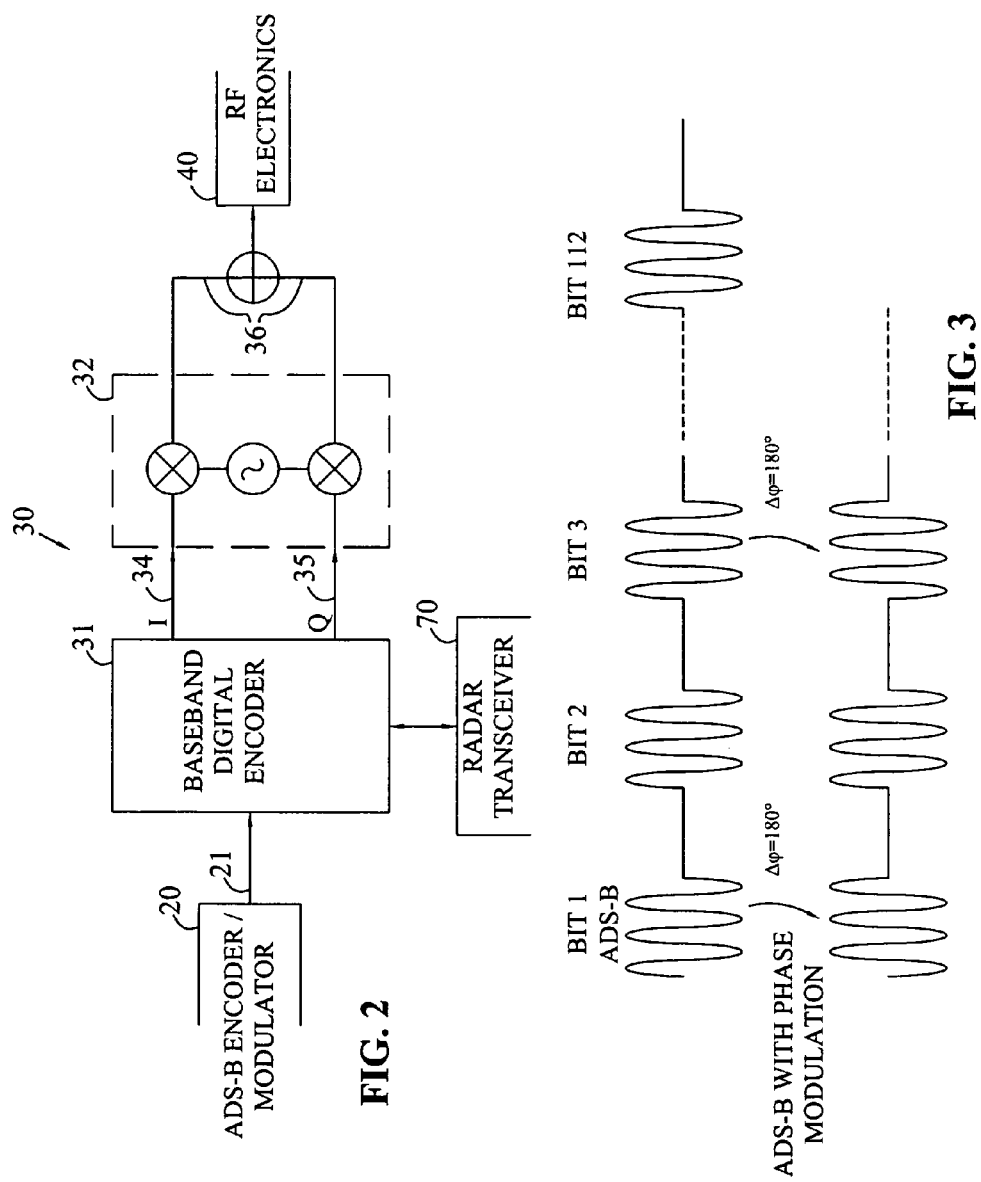

ADS-B RADAR SYSTEM

BACKGROUND OF THE INVENTION

This invention relates to an airborne radar system, and in particular, to avionics and airborne collision avoidance radar systems, that utilizes Automatic Dependent Surveillance-Broadcast (ADS-B) transponders.

Due to increasing air traffic and capacity limitations of conventional or primary radar systems, there is a need for the next generation surveillance systems to insure aircraft safe separation. Primary surveillance radar systems operate by sending out microwave energy that is reflected back by an aircraft's metallic surfaces. The reflected signal is received back at the radar transmission site and displayed as location information. The primary surveillance radar systems may be either land-based or airborne. For land-based systems, the received information may be used by an air traffic controller to separate air traffic. However, land-based primary surveillance radar has limitations at low altitudes, does not work on the ground, and may also be influenced by atmospheric and weather conditions. Airborne primary surveillance radar is expensive and typically limited to large commercial or military aircraft. Accordingly, there has been a drive to establish secondary surveillance radar systems to supplement the primary surveillance radar.

One type of secondary surveillance radar system is known as Traffic Alert and Collision Avoidance System (TCAS). The TCAS system works with cooperative targets equipped with TCAS avionics. When one TCAS-equipped aircraft approaches a second aircraft, the first aircraft determines the location of the second aircraft by transmitting an interrogation signal at regular intervals. If the second aircraft is equipped with a compatible transponder (one such type of transponder is known as a Mode A transponder), the transponder receives the interrogation signal and responds with a signal, which allows the first aircraft to calculate the range and bearing of the second aircraft based upon direction and relative strength of the signal. Certain types of transponders also include altitude information in the response. For receiving and transmitting signals with a TCAS system, it is known to use both top and bottom L-band circular antennas.

The second aircraft may be equipped with a different type of transponder (Mode S) that may alter the method of interrogation between the aircrafts. For instance, the second aircraft may automatically transmit a message containing the address of the transmitting aircraft at set intervals, such as once a second. Then, the first aircraft can send a direct interrogation to the second aircraft, based upon the known address of the second aircraft. The second aircraft responds with a signal that includes altitude information. To minimize interference with other aircraft, the rate at which a Mode S transponder is interrogated may depend upon the range and closing speed of the two aircraft.

One example of a TCAS system is disclosed in U.S. Pat. No. 5,636,123 to Rich et aL. The system in Rich describes a TCAS system, wherein air space is divided into a grid of volume elements, and each volume element is assigned a unique pseudo-noise code. A collision avoidance signal is generated by a transmitter on an aircraft, wherein the transmission includes an appropriate pseudo-noise code for the volume element in which the aircraft is positioned.

Another TCAS system is disclosed in U.S. Pat. No. 6,459,411 B2 to Frazier et al. The system is for aircraft flying in formation and is based upon receiving and processing Mode-S transponder messages without the TCAS computer having to interrogate the transponders of the other aircraft flying in formation. The system is designed for the TCAS computer to receive and process data without having to interrogate transponders to allow safe separation between 2 to 250 aircraft flying in formation.

Yet another TCAS system is disclosed in U.S. Pat. No. 6,278,396 B1 to Tran. The TCAS system in Tran includes a module designed to include multiple phases of a tactical mission including formation fall-in, arming formation flight, engaging formation flight following, formation breakaway and air-refueling sequencing. The tactical module divides the air space around the aircraft into advisory, caution, and warning zones and provides displays and alerts in accordance with the appropriate zone.

Another TCAS system is disclosed in U.S. Pat. No. 7,006,032 B2 to King et al. The TCAS system disclosed by King utilizes a Mode-S transponder in an integrated L-band traffic surveillance apparatus embedded in a signal unit replaceable processor.

ADS-B is a surveillance system used by aircraft to inform other aircraft and ground stations about location, speed, and intention. ADS-B is becoming one of the most important technologies for air transportation. ADS-B-equipped aircraft broadcasts its position in space with a digital data link and can include other data, such as air speed, altitude and air-maneuver information. ADS-B receivers can be integrated into the air traffic control system or installed aboard other aircraft to provide an accurate depiction of real-time aviation traffic, both in the air and on the ground. ADS-B relies on satellite-based Global Positioning System (GPS) to determine an aircraft's precise location in space. The system converts the position into a digital code, which is combined with other information that can include the type of aircraft, speed, flight number, and maneuvering information. The digital code containing the information is updated at regular intervals, such as several times a second, and broadcasts from the aircraft on a discreet data link frequency. Other aircraft and ground stations up to approximately 150 miles can receive the data link broadcast and display information on a computer display.

One system that utilizes an ADS-B receiver is disclosed in U.S. Pat. No. 6,064,335 to Eschenbach. The system disclosed in Eschenbach includes a GPS receiver and an ADS-B receiver for receiving an ADS-B signal from an aircraft. The system also includes a visor for displaying a three-dimensional bearing of the aircraft based upon a GPS signal and an ADS-B signal.

Another system that utilizes ADS-B signals is disclosed in U.S. Patent Application Publication 2003/0154018 A1 to Lai. The system disclosed by Lai is designed to correlate between targets from two different target reporting sources, such as ADS-B and an on-the-ground traffic information system to provide information to nearby aircraft that are suitably equipped and within range. The system uses a fuzzy logic to produce a continuous confidence level on a component comparison between the two different target-reporting systems.

U.S. Pat. No. 6,789,016 B2 to Bayh et al. discloses an integrated airborne transponder collision avoidance system. The system disclosed by Bayh is designed to allow an ADS-B system to interoperate with commercial TCAS-equipped aircraft without significantly enlarging the volume of ADS-B equipment and without requiring additional antennas to be mounted on top and underneath the fuselage.

A limitation of ADS-B technology is that it relies on GPS, which can be jammed or compromised and can only display cooperative targets, that is, aircraft that transmit an ADS-B signal. TCAS systems have similar limitations and primary radar sensors are necessary to provide situational awareness or collision alerts for non-cooperative targets or hazards, such as birds, air turbulence, unmanned aerial vehicles, military aircraft, and general aviation aircraft without Mode-C or Mode-S transponders. However, the weight and cost of providing airborne primary radar makes this technology economically viable for only large and/or military aircraft. In addition, TCAS uses analog, beam-forming techniques and amplitude-comparison on a pulse for direction finding. Digital beam forming and spectrum estimation techniques could be used to provide an avionics improvement.

Therefore, it is an object of the present invention to provide a secondary surveillance system radar utilizing ADS-B transponders that can provide collision-avoidance information for non-cooperative targets. An additional object of the invention is that the avionics utilize a digital-beam-forming modulation of the ADS-B signal. A further object of the invention is that the system may utilize conventional top and bottom circular array antennas as are currently used on TCAS-equipped aircraft. A further object of the invention is to provide a digital matched filter and digital signal processor to analyze signals received by the antennas. Also, it would be desirable if the system could estimate the angle-of-arrival of reflected ADS-B signals so that both the azimuth and elevation of the signal may be determined.

BRIEF SUMMARY OF THE INVENTION

The above and further objects of the invention are met by the present invention, wherein an airborne radar system for detecting and tracking non-corporate targets using reflective ADS-B electromagnetic signals is provided. The radar processor is added to the standard ADS-B system, wherein the modified ADS-B transceiver has both normal ADS-B functionalities as well as what are typically primary radar functions. The modification is provided by random phase modulation that is added to a standard ADS-B waveform utilizing it as a primary radar signal. Phase coherent radio-frequency electronics are used for modulations and de-modulations. The system may utilize circular antenna arrays as are common for TCAS systems; however, digital beam forming techniques are preferred to analog beam forming and monopulse. A return signal reflected from the target is fed into a digital matched filter and a digital signal processor. Reflected target signals received by the antenna are digitalized and recorded. A multiple signal classification (MUSIC) algorithm is used to estimate the angle-of-arrival (AOA) of the received reflected ADS-B signals. It is believed the system herein described has multiple target tracking capabilities with angular accuracies comparable to TCAS systems.

In one embodiment of the invention, an airborne radar system is provided to assist with collision avoidance, wherein the radar system includes: a standard ADS-B transmitter and encoder; a phase modulator including a digital synthesizer; radio-frequency electronics with up and down conversion, amplification and filtering capabilities; antennas; and a radar transceiver that controls the phase modulation of an ADS-B waveform and implements real-time target detection and tracking.

The phase modulator may add a phase shift to a standard ADS-B waveform with the baseband digital synthesizer. The phase modulator can up convert a baseband analog waveform containing both I and Q channels to 1090 MHz. The phase modulator can be inserted bit by bit at a 180° phase shift per bit change.

The airborne radar system may include two antenna arrays. One of the arrays may be a top circular array antenna and the other array may be a bottom circular array antenna.

The radio-frequency electronics may include a switch that switches between a power amplifier and a low-noise amplifier. The switch may switch to the power amplifier when the radar transceiver is transmitting a signal through the antenna arrays and switches to the low-noise amplifier when the antenna arrays receive a signal. The radio-frequency electronics may include a demodulator to demodulate or down convert signals received by the antennas.

The radar transceiver may also include a digital signal processor, and the digital signal processor can perform matched filtering on a received signal to estimate target range. The digital signal processor may also include a program to estimate an angle-of-arrival for each signal received over a field-of-view, and wherein the angle-of-arrival estimate may include both azimuth and elevation information. The airborne radar system may further include digital filtering to enhance a signal-to-noise ratio.

Angles-of-arrival of targets may be indicated by peaks in a multiple signal classification spatial spectrum that is calculated along with scanning of a steering vector over the required field-of-view. The peaks can be extracted from the multiple signal classification spatial spectrum, and the angles-of-arrival are based on the location of the peaks.

In another embodiment of the invention, a method is provided of using a standard ADS-B transmitter and encoder to identify targets to provide a collision avoidance system, wherein the method includes the steps of: providing a standard ADS-B transmitter and encoder, a phase modulator including a digital synthesizer, radio-frequency electronics, antennas, and a radar transceiver; synthesizing digital-based band signals from the ADS-B transmitter with additional random phase modulation using the digital synthesizer; using the antennas to both transmit and receive signals; and estimating angles-of-arrival for every target in a field-of-view.

The method may also include the step of demodulating the signals received by the antennas. The method may further include the steps of providing a digital signal processor and performing matched filtering on received signals. The method may also include the step of estimating a target range of identified targets using the digital signal processor.

The radio-frequency electronics can perform the steps of up and down conversion, amplification and filtering at 1090 MHz center frequency for each antenna.

The radar transceiver may control phase modulation of a waveform generated by the ADS-B transmitter, and the method may also include the step of providing a standard ADS-B receiver to receive and decode standard ADS-B messages.

The digital synthesizer may add a phase shift to an analog waveform containing both I and Q channels, wherein the waveform is generated by the ADS-B transmitter.

The method may also include the steps of providing a switch, a power amplifier, and a low-noise amplifier in the radio-frequency electronics; switching to the power amplifier when at least one of the antennas is used to transmit a signal; and switching to the low-noise amplifier when at least one of the antenna elements is used to receive a signal.

The method can further include the steps of providing an I/Q demodulator in the radio-frequency electronics and demodulating or down-converting a radio-frequency signal.

The angles-of-arrival for each target may include azimuth and elevation. The method can further include the steps of calculating a multiple signal classification spatial spectrum and scanning a steering vector over the field-of-view. The method can further include the steps of extracting peaks from the multiple signal classification spatial spectrum and computing angles-of-arrival based upon the location of the peaks.

In another embodiment of the present invention, a method is provided of using a standard ADS-B transmitter and encoder to identify targets to provide a collision avoidance system, wherein the method includes the steps of: providing a standard ADS-B transmitter and encoder, a phase modulator, radio-frequency electronics including a digital signal processor, antennas, and a radar transceiver; synthesizing digital baseband signals from the ADS-B transmitter with additional random phase modulation; demodulating signals received by the antennas; and estimating target range using the digital signal processor.

The antennas can both transmit and receive signals. The method may also include the step of performing matched filtering on a received signal.

The method may further include the step of estimating angles-of-arrival for each target in the field-of-view, and the angles-of-arrival may include both azimuth and elevation.

The method may also include the steps of calculating a multiple signal classification spatial spectrum of data sets derived from signals received from the antennas, extracting peaks from the multiple signal classification spatial spectrum and computing angles-of-arrival based on the location of the peaks.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 2 is a schematic diagram of a radio-frequency phase modulator of the ADS-B collision avoidance radar system of FIG. 1;

FIG. 3 is an illustration of adding a random phase shift to a standard ADS-B waveform;

Figure 1:
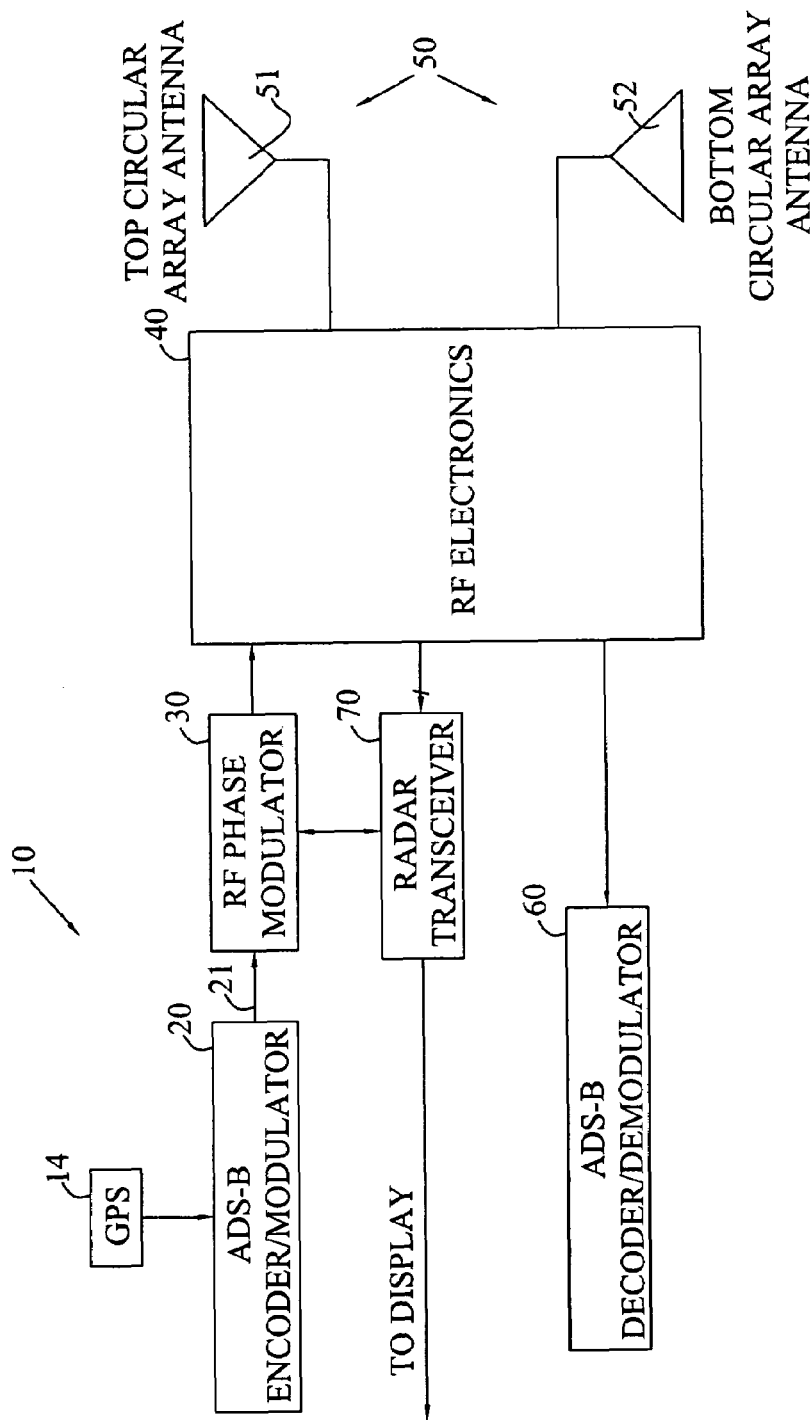
FIG. 1 is a block diagram of one embodiment of an ADS-B collision avoidance radar system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIG. 1, an airborne radar system to assist with collision avoidance is shown, generally indicated as 10. Radar system 10 utilizes a Global Positioning System (GPS) 14 as is well known to provide information to a standard ADS-B encoder/transmitter/modulator 20. Radar system 10 further includes a radio-frequency phase modulator 30, radio-frequency electronics 40, an antenna system, generally indicated as 50, a standard ADS-B receivers/decoders/demodulators 60, and a radar transceiver 70.

ADS-B transmitter/modulator 20 delivers an ADS-B message stream 21 to phase modulator 30 at about 1 Mbits/s. It should be noted that a typical complete ADS-B message consists of a 4-pulse preamble of 8 μs and following 112-pulse data block in 112 μs. The message typically contains own aircraft information. In one embodiment, phase modulator 30 is a digital synthesizer and I/Q modulator. The baseband digital synthesizer 31 synthesizes the digital baseband signals with additional random phase modulation. Referring now to FIG. 2, a more detailed diagram of phase modulator 30 is shown. Phase modulator 30 also includes a converter 32 to up-convert the baseband analog waveform of both I and Q channels 34 and 35, respectively, to 1090 MHz. The up-convert signal travels to the radio-frequency electronics 40 for transmission by antenna system 50. Now referring to FIG. 3, an illustration of how the random phase shift is added to a standard 1090 ES ADS-B waveform is depicted. The phase shift is inserted pulse-by-pulse, and the pulse-position modulation with phase shifting is synthesized digitally at the I/Q baseband and up-converted to 1090 MHz carrier frequency. In the embodiment shown, a 180° phase shift is added pulse-by-pulse in a random manner. In addition, the random phase shift code is put in memory during each message transmission. When reflected pulses are received, the system will try to match the amplitude and phase changes from pulse to pulse in a pulse-compression or matched filtering process, as discussed below in further detail. It is believed that the 180° phase shift (bi-phase modulation) depicted provides better noise-immunity than other phase-shifting values.

Figure 4:
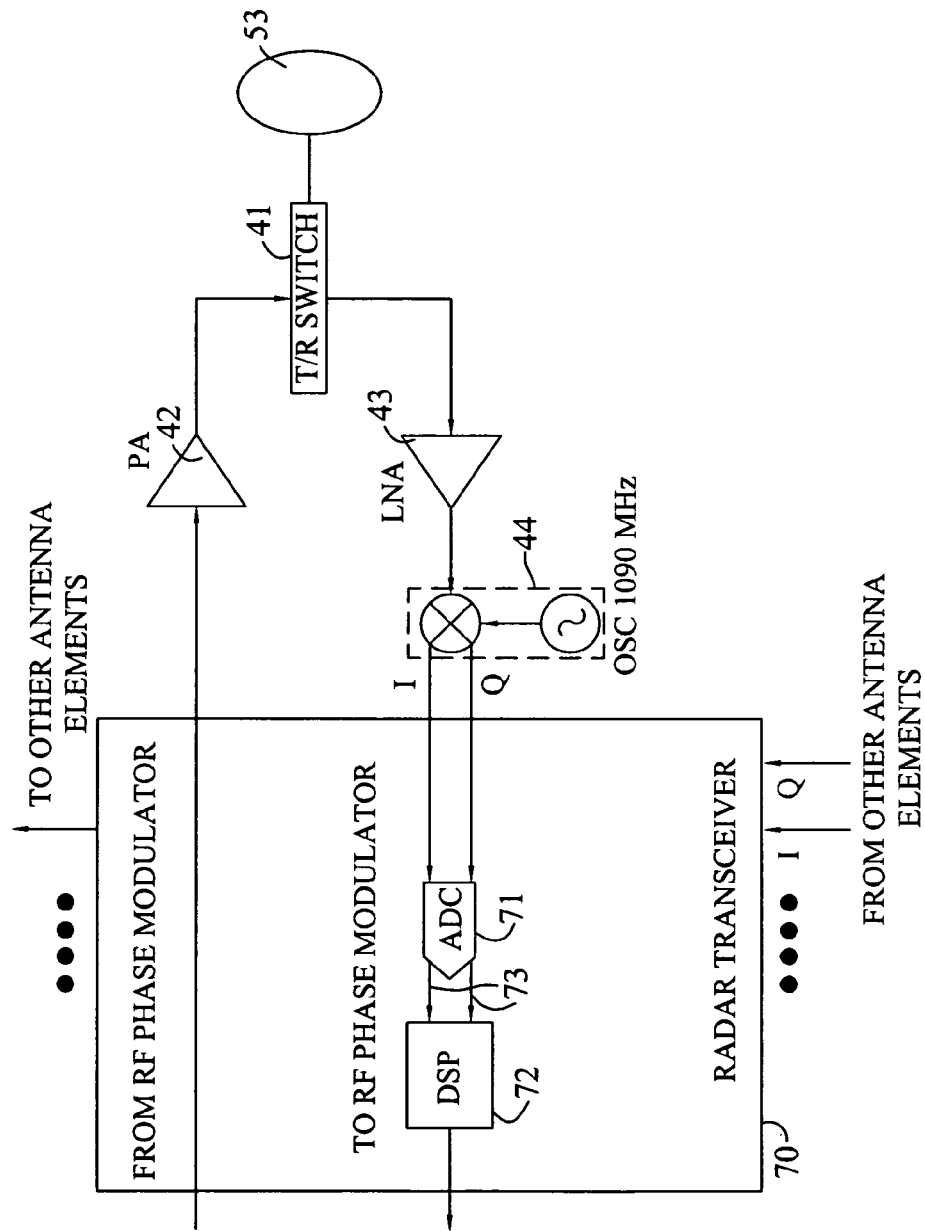
FIG. 4 is a schematic diagram of a radar transceiver and radio-frequency electronics of the ADS-B collision avoidance radar system of FIG. 1.

Referring again to FIG. 1, antenna system 50 includes a plurality of antennas, which, in the embodiment shown, include a top circular array antenna 51, and a bottom circular array antenna 52. The arrays include individual elements 53 (FIG. 4). Circular array antennas 51 and 52 may be of a 4- or 8-element type as is common for TCAS systems or a 16-element type antenna.

Now referring to FIG. 4, additional detail of the array of radio-frequency electronics 40 is provided. The radio-frequency electronics include a switch 41, a power amplifier 42, a low-noise amplifier 43, and an I/Q demodulator 44. When transmitting a signal, switch 41 switches to power amplifier 42, which sends a signal to be transmitted over an element 53 of antenna system 50. When antenna element 53 is receiving a signal, switch 41 switches to pass the signal through to low-noise amplifier 43, which feeds into I/Q demodulator 44. I/Q demodulator 44 demodulates or down-converts the received radio-frequency signal, which is forwarded to radar transceiver 70.

Referring again to FIG. 4, additional detail of radar transceiver 70 is shown. Radar transceiver 70 includes an analog-to-digital converter (ADC) 71 and a digital signal processor (DSP) 72. Analog-to-digital converter 71 receives a signal from I/Q demodulator 44 that is associated with a reflected target signal received by antenna element 53 and converts the signal into digitalized data 73. The digitalized data 73 is routed into digital signal processor 72, wherein a filtering match is performed to verify that the signal received coincides with a transmitted signal that is indicative of a signal reflected from a target. Digital signal processor 72 also estimates the target range and runs an imbedded program to estimate an angle-of-arrival (AOA) for each target in the field-of-view. In one embodiment, digital signal processor 72 is on a re-configurable, software-defined platform. It is further believed that the digital scheme illustrated in FIG. 4 provides a benefit over conventional analog schemes by providing better sensitivity and may have a range from the original −90 dBm down to −115 dBm.

Figure 5:
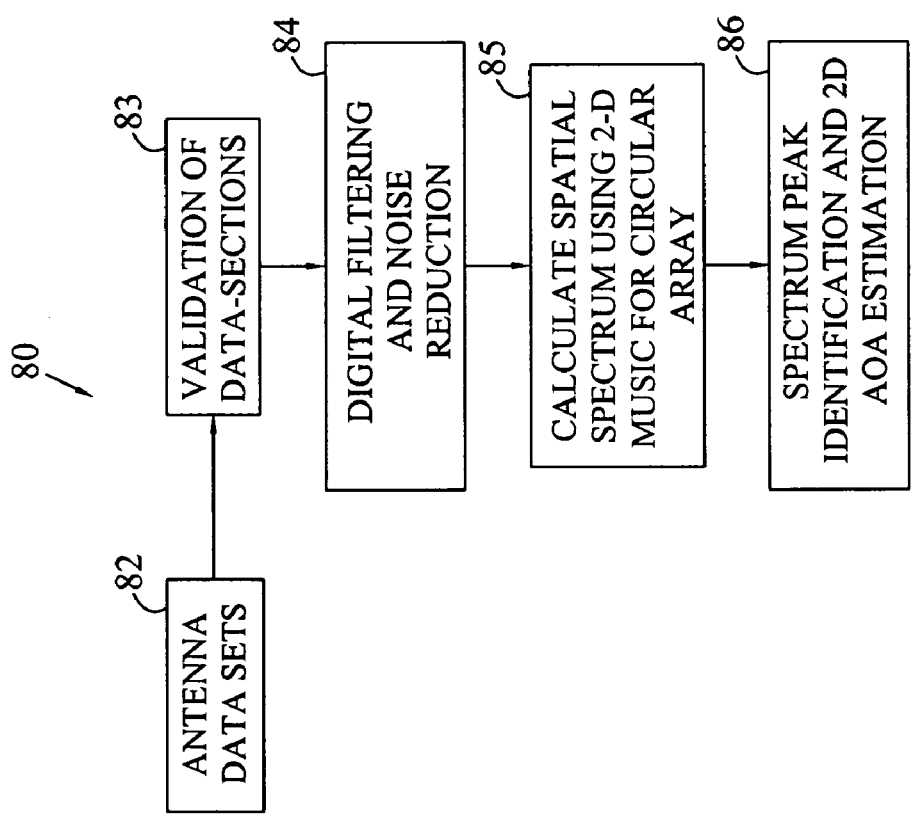
FIG. 5 is a flow chart for providing target angle-of-arrival estimations from data received by an antenna in the ADS-B collision avoidance radar system of FIG. 1.

Another aspect of the subject invention is that the AOA for each target includes both azimuth and elevation information. Referring now to FIG. 5, a flow chart, generally indicated as 80, is shown for the processing of the signals and determination of the AOA. In the first step of the process, the antenna provides signals/data sets that are representative of a reflected target (step 82). In the next step, validation of the data sets is performed to assure that the data are valid real-pulsed target return (step 83). Matched filtering is used for this step. Next, digital filtering can be used to further enhance the signal-to-noise ratio (step 84). Then, in a key step, a multiple signal classification (MUSIC) spatial spectrum is calculated along with the scanning of the steering vector over the required field-of-view (step 85). As indicated in step 86, the peaks from the multiple signal classifications spatial spectrum are extracted; and the angles-of-arrival (AOAs) are computed based upon the location of the peaks.

It should be noted that the relative time-of-arrival (TOA) signal on each array element is a function of both the azimuth angle and elevation angle. Furthermore, when the antenna array diameter is smaller than a fraction of a wavelength, the relative phase-shift of the carrier signal gives a direct indication of the relative TOA, and hence the AOA. Furthermore, the multiple signal classification function may be calculated as follows:

$$S_{MUSIC}(\varphi, \theta) = \frac{1}{e^H(\varphi, \theta) V_N V_N^H e(\varphi, \theta)}$$

where $e(\phi,\theta)$ is the steering vector for the circular array, i.e., $e(\phi,\theta)=[e^{jRsin\theta Rsi(\phi-\phi_1)}, \ldots e^{jRsin\theta Rsi(\phi-\phi_M)}]^T$, search 3D space with varying $(\phi,\theta)$ until locating L highest peaks. The AOAs associated with these peaks are the target AOA estimations, and wherein the eigenvectors associated with the M-L smallest eigenvalues and construct noise-space vector as $$V_N=[V_{L+1} V_{L+2} \ldots V_M]$$

It should also be appreciated that more sophisticated algorithms, such as real beam-space MUSIC, adaptive beam forming for Uniform Circular Array (UCA), and Root-MUSIC for faster spectral peak identification may also be employed. In addition, further algorithms may be developed to address high noise power, multipath, coherent signal sources, and multiple false spectral peaks.

It should also be appreciated that the peak transmit power, as defined by the Radio Technical Commission or Aeronautics (RTCA) in the 1090 MHz ADS-B standard must be less than 500 watts. It is believed that similar to TCAS, the system can detect targets with 1 m² Radar Cross-Section (RCS), which equates to small general aviation aircraft, at a range up to 6 nm ile or 11.2 km, which is consistent with the specification for TCAS systems. The range of resolution is limited by a bandwidth to 75 meters, which means two targets can be discriminated at the same angle if they are 75 meters or more apart. It is believed that this is sufficient for most collision avoidance radar applications. It is also believed that the system of the present invention has sufficient angular accuracy comparable to an enhanced TCAS system, which is better than 4° in both azimuth and elevation angles. It should also be appreciated that the antenna pattern and scanning can be designed to cover the required azimuth/elevation field-of-view so it is believed that the digital processor 72 can handle up to about 20 targets in real time. It is also anticipated that the present system and method can achieve an angular azimuth field-of-view of ±110° and an angular elevation field-of-view of ±30°. It should also be appreciated that the user interface and collision avoidance logic can be similar to that in current TCAS systems.

Another advantage of the present invention is that it is believed the radar system disclosed complies with the 1090 MHz ADS-B standard. The reason for this is that adding phase modulation does not change the peak transmit power, so that transmit power remains within the allowable range (less than 500 watts) of the ADS-B system. Additionally, for other common ADS-B receivers that only de-modulate amplitude information, but do not provide phase information, adding phase shifting will not change the normal functionality of ADS-B transceivers. It should be noted that adding phase modulation will raise the transmit signal spectrum sidelobes compared with standard ADS-B signals to make them smoother; however, it is believed that the spectrum will comply with the ADS-B standard.

While the invention has been taught with specific reference to these embodiments, one skilled in the art will recognize that changes can be made in form and detail without departing from the spirit and scope of the invention. For example, although the embodiment discussed uses an I/Q modulator and digitally synthesized I/Q signals, it should be appreciated that switching between two carrier frequencies with a 180° phase difference may also be used to provide the phase shift. In addition, other antenna arrays may be utilized. The described embodiments are to be considered, therefore, in all respects only as illustrative and not restrictive. As such, the scope of the invention is indicated by the following claims rather than by the description.

The invention claimed is:

1. An airborne radar system to assist with collision avoidance, the radar system comprising:
   a standard ADS-B transmitter and encoder;
   a phase modulator including a digital synthesizer;
   radio-frequency electronics containing an up and down conversion, amplification and filtering capabilities;
   antennas; and
   a radar transceiver that controls the phase modulation of an ADS-B waveform and implements real-time target detection and tracking.

2. The airborne radar system as set forth in claim 1, wherein said phase modulator adds a phase shift to a standard ADS-B signal with a baseband digital synthesizer.

3. The airborne radar system as set forth in claim 2, wherein said phase modulator up converts a baseband analog waveform containing both I and Q channels to 1090 MHz.

4. The airborne radar system as set forth in claim 2, wherein said phase shift is inserted bit by bit at a 180° phase shift per bit change.

5. The airborne radar system as set forth in claim 1, including two antenna arrays.

6. The airborne radar system as set forth in claim 5, wherein one of said arrays is a top circular array antenna and said other array is a bottom circular array antenna.

7. The airborne radar system as set forth in claim 1, wherein said radio-frequency electronics include a switch that switches between a power amplifier and a low-noise amplifier.

8. The airborne radar system as set forth in claim 7, wherein said switch switches to said power amplifier when said radar transceiver is transmitting a signal through said antenna arrays and switches to said low-noise amplifier when the antenna arrays receive a signal.

9. The airborne radar system as set forth in claim 8, wherein said radio-frequency electronics include a demodulator to demodulate or down convert signals received by said antennas.

10. The airborne radar system as set forth in claim 9, wherein said radar transceiver includes a digital signal processor.

11. The airborne radar system as set forth in claim 10, wherein said digital signal processor performs matched filtering on a received signal to estimate target range.

12. The airborne radar system as set forth in claim 11, wherein said digital signal processor also includes a program to estimate an angle-of-arrival for each signal received over a field-of-view.

13. The airborne radar system as set forth in claim 12, wherein said angle-of-arrival estimate includes both azimuth and elevation information.

14. The airborne radar system as set forth in claim 13, further including digital filtering to enhance a signal-to-noise ratio.

15. The airborne radar system as set forth in claim 14, wherein target angles-of-arrival are indicated by peaks in a multiple signal classification spatial spectrum that is calculated along with scanning of a steering vector over the required field-of-view.

16. The airborne radar system as set forth in claim 15, wherein peaks are extracted from the multiple signal classification spatial spectrum, and the angles-of-arrival are based on the location of the peaks.

17. A method of using a standard ADS-B transmitter and encoder to identify targets to provide a collision avoidance system, the method comprising the steps of:
providing a standard ADS-B transmitter and encoder, a phase modulator including a digital synthesizer, radio-frequency electronics, antennas, and a radar transceiver,
synthesizing digital-based band signals from said ADS-B transmitter with additional random phase modulation using said digital synthesizer;
using said antennas to both transmit and receive signals; and
estimating angles-of-arrival for each target in a field-of-view.

18. The method of using a standard ADS-B transmitter and encoder to identify targets to provide a collision avoidance system as set forth in claim 17, including the step of demodulating the signals received by said antennas.

19. The method of using a standard ADS-B transmitter and encoder to identify targets to provide a collision avoidance system as set forth in claim 17, including the steps of providing a digital signal processor and performing matched filtering on received signals.

20. The method of using a standard ADS-B transmitter and encoder to identify targets to provide a collision avoidance system as set forth in claim 19, including the step of estimating a target range of identified targets using said digital signal processor.

21. The method of using a standard ADS-B transmitter and encoder to identify targets to provide a collision avoidance system as set forth in claim 17, wherein said radio-frequency electronics perform the steps of up and down conversion, amplification and filtering at 1090 MHz center frequency for each antenna.

22. The method of using a standard ADS-B transmitter and encoder to identify targets to provide a collision avoidance system as set forth in claim 17, wherein said antennas include a top 16-element circular array and a bottom 16-element circular array.

23. The method of using a standard ADS-B transmitter and encoder to identify targets to provide a collision avoidance system as set forth in claim 17, wherein said radar transceiver controls phase modulation of a waveform generated by said ADS-B transmitter.

24. The method of using a standard ADS-B transmitter and encoder to identify targets to provide a collision avoidance system as set forth in claim 23, wherein said radar transceiver provides real-time target detection tracking.

25. The method of using a standard ADS-B transmitter and encoder to identify targets to provide a collision avoidance system as set forth in claim 17, including the step of providing a standard ADS-B receiver to receive and decode standard ADS-B messages.

26. The method of using a standard ADS-B transmitter and encoder to identify targets to provide a collision avoidance system as set forth in claim 17, wherein said digital synthesizer adds a phase shift to an analog waveform containing both I and Q channels, the waveform being generated by the ADS-B transmitter.

27. The method of using a standard ADS-B transmitter and encoder to identify targets to provide a collision avoidance system as set forth in claim 26, wherein said digital synthesizer converts said analog waveform to 1090 MHz.

28. The method of using a standard ADS-B transmitter and encoder to identify targets to provide a collision avoidance system as set forth in claim 17, including the steps of providing a switch, a power amplifier, and a low-noise amplifier in said radio-frequency electronics; switching to the power amplifier when at least one of said antennas is used to transmit a signal; and switching to said low-noise amplifier when at least one of said antenna elements is used to receive a signal.

29. The method of using a standard ADS-B transmitter and encoder to identify targets to provide a collision avoidance system as set forth in claim 17, including the steps of providing an I/Q demodulator in said radio-frequency electronics and demodulating or down-converting a radio-frequency signal.

30. The method of using a standard ADS-B transmitter and encoder to identify targets to provide a collision avoidance system as set forth in claim 17, wherein the angles-of-arrival for each target include azimuth and elevation.

31. The method of using a standard ADS-B transmitter and encoder to identify targets to provide a collision avoidance system as set forth in claim 17, including the steps of calculating a multiple signal classification spatial spectrum and scanning a steering vector over the field-of-view.

32. The method of using a standard ADS-B transmitter and encoder to identify targets to provide a collision avoidance system as set forth in claim 30, including the steps of extracting peaks from the multiple signal classification spatial spectrum, and computing angles-of-arrival based upon the location of the peaks.

33. A method of using a standard ADS-B transmitter and encoder to identify targets to provide a collision avoidance system, the method comprising the steps of:

providing a standard ADS-B transmitter and encoder, a phase modulator, radio-frequency electronics including a digital signal processor, antennas, and a radar transceiver, synthesizing digital-based band signals from said ADS-B transmitter with additional random phase modulation;

demodulating signals received by said antennas; and estimating target range using said digital signal processor.

34. The method of using a standard ADS-B transmitter and encoder to identify targets to provide a collision avoidance system as set forth in claim 33, wherein said antennas both transmit and receive signals.

35. The method of using a standard ADS-B transmitter and encoder to identify targets to provide a collision avoidance system as set forth in claim 33, including the step of performing matched filtering on a received signal.

36. The method of using a standard ADS-B transmitter and encoder to identify targets to provide a collision avoidance system as set forth in claim 33, including the step of estimating angles-of-arrival for each target in the field-of-view.

37. The method of using a standard ADS-B transmitter and encoder to identify targets to provide a collision avoidance system as set forth in claim 36, wherein the angles-of-arrival include both azimuth and elevation.

38. The method of using a standard ADS-B transmitter and encoder to identify targets to provide a collision avoidance system as set forth in claim 33, including the step of calculating a multiple signal classification spatial spectrum of data sets derived from signals received from said antennas.

39. The method of using a standard ADS-B transmitter and encoder to identify targets to provide a collision avoidance system as set forth in claim 38, including the steps of extracting peaks from the multiple signal classification spatial spectrum and computing angles-of-arrival based on the location of the peaks.

* * * * *

UNITED STATES PATENT AND TRADEMARK OFFICE
CERTIFICATE OF CORRECTION

| | |
|---|---|
| PATENT NO. | : 7,414,567 B2 |
| APPLICATION NO. | : 11/644422 |
| DATED | : August 19, 2008 |
| INVENTOR(S) | : Yan Zhang and Jinglu Qiao |

It is certified that error appears in the above-identified patent and that said Letters Patent is hereby corrected as shown below:

Column 1, line 5, please insert the following:

This invention was made with Government support under Contract No. NNL06AA27P awarded by NASA. The Government has certain rights in the invention.

Signed and Sealed this

Twenty-eighth Day of October, 2008

JON W. DUDAS
*Director of the United States Patent and Trademark Office*